INVENTOR
HERBERT B. BASKIN
BY Francis J. Thomas
ATTORNEY

CONNECTIVITY CONDITIONS

July 20, 1965 H. B. BASKIN 3,196,398

PATTERN RECOGNITION PREPROCESSING TECHNIQUES

Filed May 21, 1962 11 Sheets-Sheet 6

July 20, 1965 H. B. BASKIN 3,196,398

PATTERN RECOGNITION PREPROCESSING TECHNIQUES

Filed May 21, 1962 11 Sheets-Sheet 8

CONNECTIVITY FUNCTION

THRESHOLD CIRCUIT

SHIFT REGISTER

BIASED MAJORITY CIRCUIT 3,196,398
PATTERN RECOGNITION PREPROCESSING TECHNIQUES
Herbert B. Baskin, Mohegan Lake, N.Y., assignor to International Business Machines Corporation, New York, N.Y., a corporation of New York
Filed May 21, 1962, Ser. No. 196,061
9 Claims. (Cl. 340—146.3)

This invention relates to preprocessing techniques for pattern recognition and, more specifically, to methods and apparatus for generating a thin-line continuous pattern from a wide-line pattern to enhance the reliability of various types of character recognition systems, including those which employ shape or feature detection techniques.

The automatic recognition of wide-line patterns, such as those found on carbon-copy documents and documents produced by many copying devices, is relatively difficult. The problem is further complicated if use is to be made of general purpose character recognition systems that are capable of reading diversified documents including printed material of varying quality, ribbon and carbon typewritten copies, and copies made by the various reproduction machines.

The most commonly-used attempts to compensate for varying print quality in character recognition systems make use of manual or automatic contrast control which compensates for deviations in print intensity. Wide-line characters can be somewhat improved by selecting only high-intensity data and discarding the lower-intensity data. These techniques of contrast control often require extremely accurate adjustment and, even when properly adjusted, generally provide relatively poor results because low contrast areas of the characters are sometimes discarded causing line discontinuties and high-intensity smudges are often retained. Other line-thinning or edge-peeling functions provide thin-line patterns by operating on a binary representation of the input pattern. In accordance with the present invention, a thin-line pattern is generated from a wide-line pattern in such away that continuity of lines is preserved even though the lines may be of low intensity and the undesirable peripheral smudges are deleted even though they are of high intensity. Furthermore, the present invention makes use of the intensity of the various areas of the pattern to bias the resulting thin-line pattern toward the high-intensity portion of the input pattern.

In accordance with the invention, the patterns on the document are scanned and analog data representations of the intensity of the scanned points on the document are generated. This analog data is partitioned by a group of thresholding circuits into several ranges and the data in the lowest range of values (corresponding to the lowest-intensity points) is operated on by a connectivity function which determines which, if any, of this data corresponds to connecting points on the input pattern. Any data in the lowest range which is necessary to preserve the continuity of the pattern lines is retained. During the subsequent cycles of operation, the data representations in the successively higher ranges are operated on by the connectivity function and additional data that is unnecessary for line continuity is discarded. After several iterations, a representation is generated that corresponds to a thin-line pattern and is biased in the direction of the high-intensity portions of the scanned patterns. Although the input has been described as analog data, these techniques are equally applicable to multi-valued digital data and the generic term "multi-valued data" is used to include analog data as well as non-binary digital data.

A primary object of the present invention is to provide techniques for enhancing the quality of line patterns, including alpha-numeric characters.

Another object is to provide techniques for converting wide-line patterns into thin-line patterns.

A further object of the present invention is to provide techniques for generating continuous, thin-line patterns from wide-line patterns.

A still further object is to provide techniques for generating data representations of continuous thin-line patterns from data representations of wide-line pattern intensity distributions.

Another object is to provide methods and apparatus for generating representations of thin-line patterns from multi-valued digital and analog data representations of wide-line pattern intensity distributions.

A further object is to provide techniques for generating representations of continuous thin-line patterns from multi-valued digital and analog data representations of wide-line pattern intensity distributions by retaining only that data corresponding to connecting points in the wide-line patterns.

A still further object is to provide techniques for generating representations of continuous thin-line patterns from multi-valued digital and analog data representations of wide-line pattern intensity distribution by retaining only that data corresponding to connecting points within the wide-line pattern by iteratively operating on the patterns with a connectivity function, wherein only that data corresponding to connecting points is retained and wherein high-valued data (corresponding to high-intensity points) is given priority over lower-valued data (corresponding to lower-intensity points).

The foregoing and other objects, features and advantages of the invention will be apparent from the following more particular description of a preferred embodiment of the invention, as illustrated in the accompanying drawings.

In the drawings:

FIGURE 1 is a block diagram of a preferred embodiment of the invention.

FIGURE 2*a* is an intensity distribution diagram showing the output of a scanner for a typical lower-case "*e*."

FIGURE 2*b* is a diagram showing the result of operating on the pattern shown in FIGURE 1 with the preferred embodiment.

FIGURES 3*a*, 3*b* and 3*c* are diagrams showing the typical lower case "*e*" of FIGURE 2*a* after successive operations of the connectivity function.

FIGURES 4*a* and 4*b* are functional diagrams showing the connectivity function mathematically and geometrically, where FIGURE 4 shows the composite arrangement of FIGURES 4*a* and 4*b*.

FIGURES 5*b*, 5*b* and 5*c* constitute a functional diagram of the preferred embodiment of the invention that is shown in block-diagram form in FIGURE 1, where FIGURE 5 shows the composite arrangement of FIGURES 5*a*, 5*b* and 5*c*.

FIGURES 6*a* and 6*b* constitute a functional diagram of the connectivity function circuit that is shown in block diagram form in FIGURES 5*a*, 5*b* and 5*c*, where FIGURE 6 shows a composite arrangement of FIGURES 6*a* and 6*b*.

Figure 1:
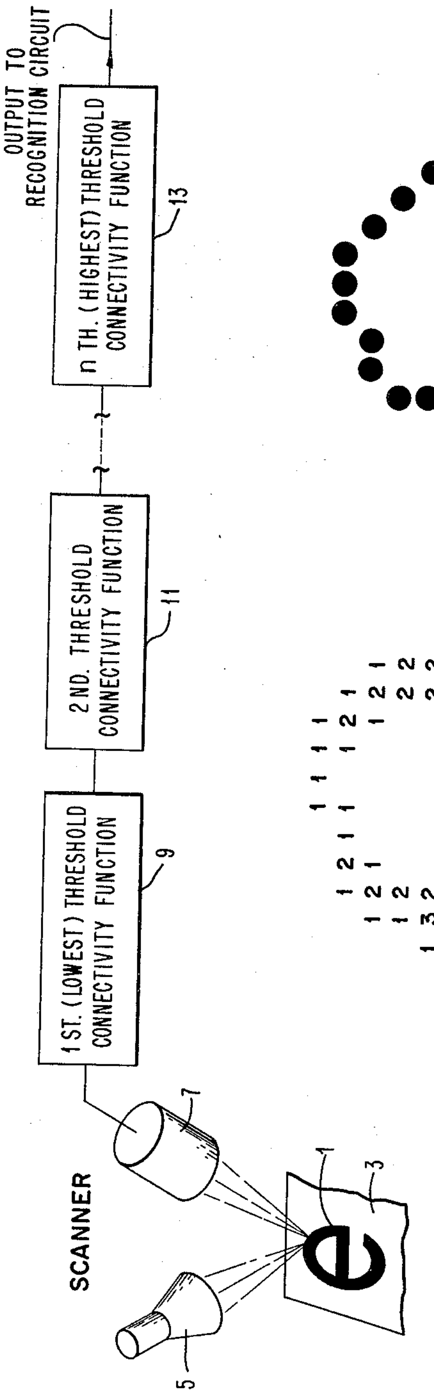

A preferred embodiment of the invention is illustrated in the block diagram of FIGURE 1. The specimen 1 to be identified is shown, by way of example, to be the lower case alphabetic character "*e*" and is located on a document 3. The document and specimen are scanned in a conventional manner by a flying spot (cathode ray tube) scanner 5 and a light-sensitive device 7, such as a photomultiplier or photocell. The scanner provides a time-varying analog output signal indicative of the intensity of light reflected by the document as the light beam (or raster) from the cathode ray tube is directed over the document area.

FIGURE 2 shows a quantized (thresholded) version of the scanner output for a typical specimen "*e*." It should be noted that this typical specimen has lines of inconsistent width, varying from one to four units wide. If the scanner sensitivity were decreased, or the scanner output thresholded at a high value such that the areas having an intensity of one unit were disregarded, the specimen would be seriously distorted. In this case, the wide lines at the left portion of the specimen would be thinned but the horizontal bar and a portion of the top of the specimen would be deleted. Furthermore, the end of the curved line at the lower right portion of the specimen would be somewhat shortened.

Figure 2A:
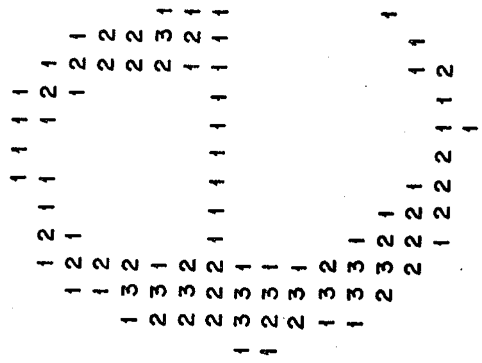
Figure 2B:
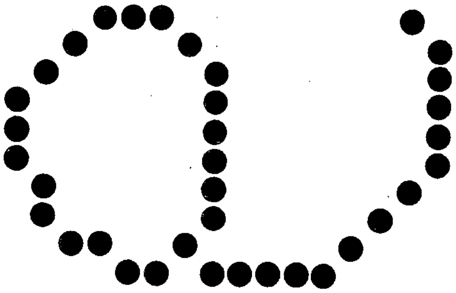

In accordance with the invention, the data shown in FIGURE 2*a* is converted to the pattern shown in FIGURE 2*b*. Note that this output pattern is made up of a continuous thin line that essentially follows the intensity ridge of the input pattern (FIGURE 2*a*). Those elemental areas having low intensities are retained where they are needed to preserve the continuity of the lines while higher-intensity areas that are not necessary for connectivity are discarded.

Figures 3A, 3B, 3C:
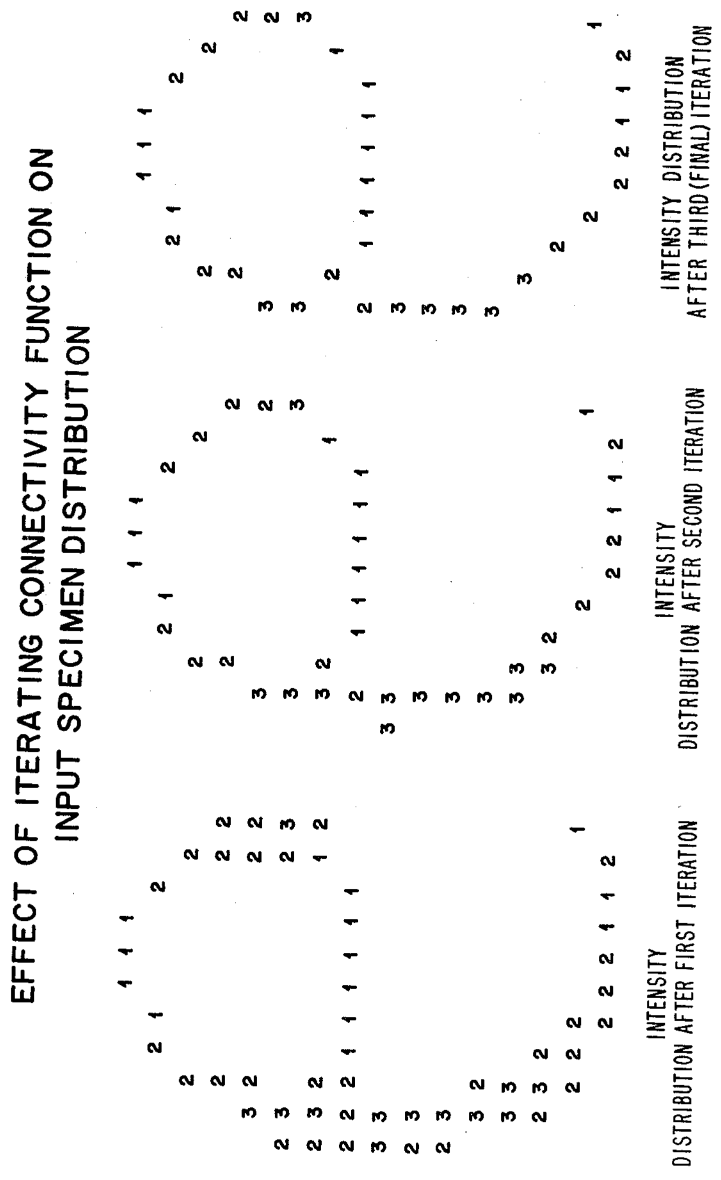

The thin-line, continuous pattern shown in FIGURE 2*b* is generated by operating on the input specimen intensity pattern (FIGURE 2*a*) with a sequence of thresholded connectivity functions 9, 11, 13 as shown in the block diagram of FIGURE 1. In this manner, low intensity non-connecting points are deleted in the first operation, and successively higher intensity non-connecting points are subsequently removed. This sequence of operation is shown in FIGURE 3 for a three-stage system. Note that the first stage of the iteration provides a pattern (FIGURE 3*a*) which retains only those points with one-unit intensities that are needed to preserve line continuity. Similarly, the second stage of the iteration (FIGURE 2*b*) removes those unnecessary points with two-unit intensities, and the third stage deletes unnecessary points with three-unit intensities. Hence, the process not only provides a thin-line pattern, but insures that the resulting pattern follows the high-intensity regions of the input specimen.

Figures 4, 4A:
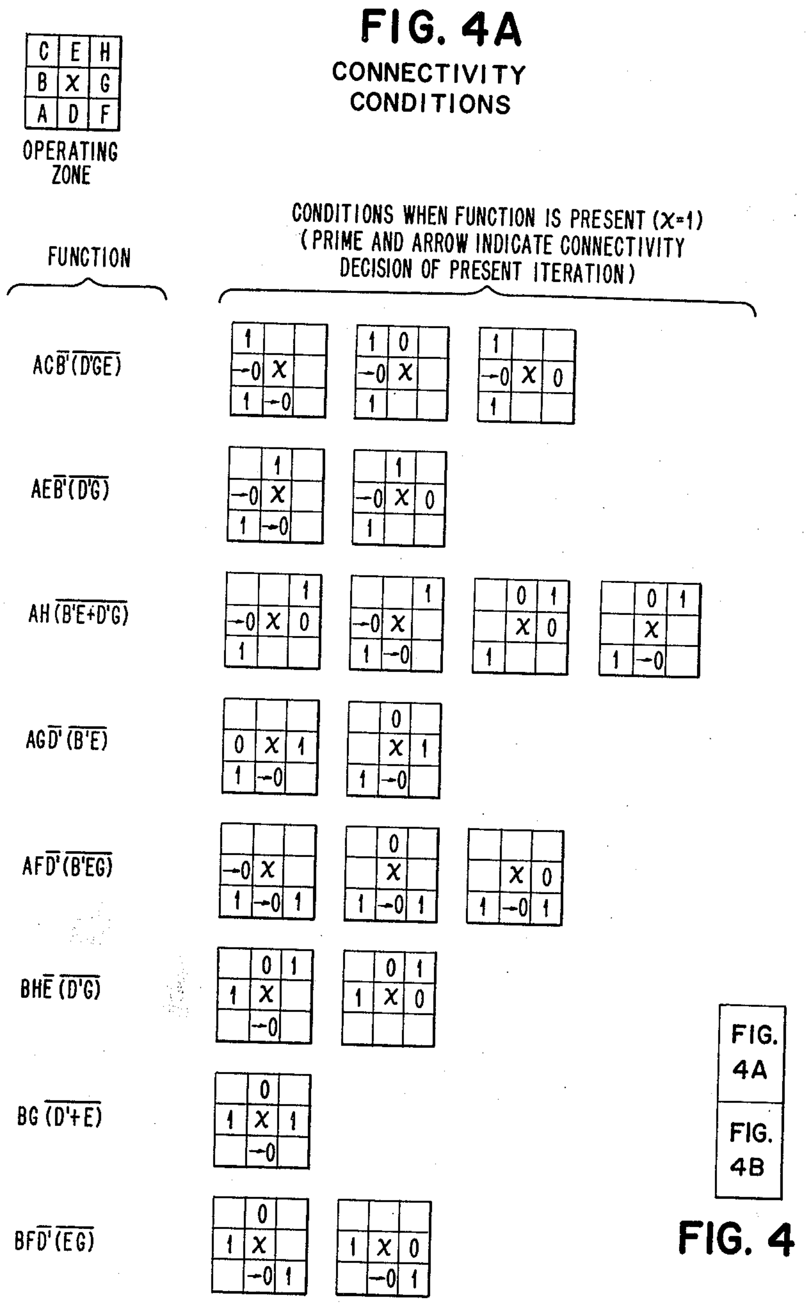
Figure 4B:
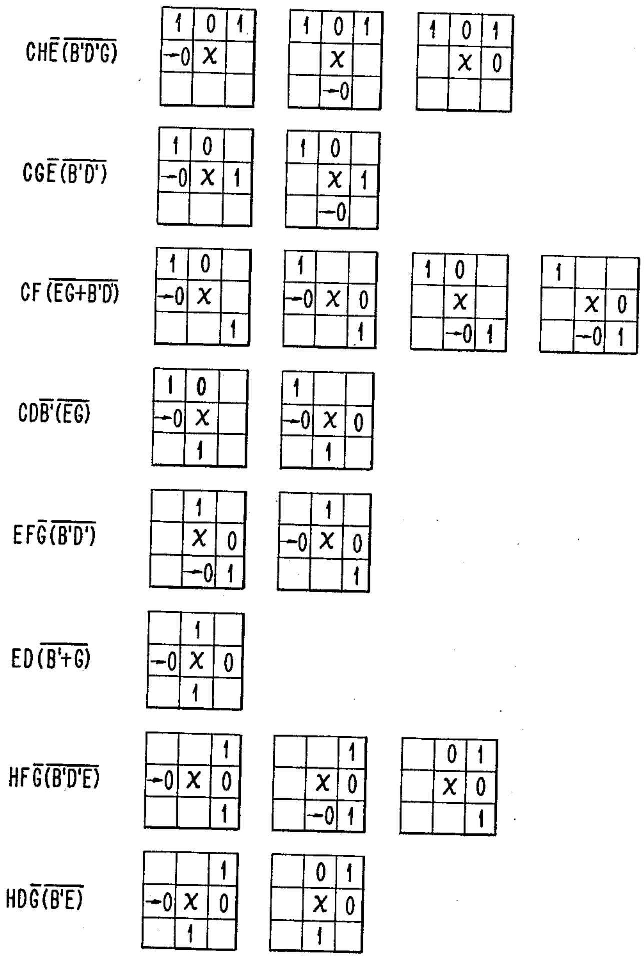

Of the many connectivity functions which could be utilized, the function shown in FIGURES 4*a* and 4*b* has been found to be especially useful, and the patterns shown in FIGURES 2*b*, 3*a*, 3*b* and 3*c* were derived using this function, with a minor modification to be described later. The connectivity function shown in FIGURES 4*a* and 4*b* operates on a three unit square "operating zone" (FIGURE 4*a*), where the center point ($x$) is the area under consideration, and the surrounding points (A, B, C, D, E, F, G and H) together with the center point, determine whether the center point is necessary to preserve the continuity of a line. FIGURES 4*a* and 4*b* show the connectivity conditions that fulfill the following concept:

(1) A point is connecting if there is no available alternate path which would preserve continuity (connectivity) between two or more surrounding points.

(2) Continuity is considered to be preserved if a horizontal, vertical or diagonal path is present, or if a combination of these paths is present.

This concept is merely one of a large family of connectivity concepts. Another useful concept retains points necessary for horizontal or vertical connectivity and does not rely on diagonal paths.

The three unit square operating zone is scanned through each column of the specimen intensity distribution pattern (shown in FIGURE 2*a*) from bottom to top, starting with the left side of the pattern. Thus, operating zone areas A, B, C and D were "$x$" areas at some previous time in the present stage of the iteration because they are to the left of or below the "$x$" area. In order to properly determine whether any given point $x$ is a connecting point it is necessary to consider, not only the status of the surrounding areas (A, B, C, D, E, F, G and H) as they existed before the iteration, but also the resulting status of those areas that have been previously tested for connectivity in the current stage of the iteration. In FIGURES 4*a* and 4*b* this resulting status is defined as A′, B′, C′ and D′ in the column of Boolean functions and by small arrows in the connectivity conditions diagrams. In order that the functions and diagrams in FIGURES 4*a* and 4*b* will be readily understood an example will be described using the function $BG(\overline{D'+E})$. In the functions, the symbol "+" indicates the Boolean "or," and a bar above an expression indicates the negation of the function. An "and" condition is shown by parentheses or by the absence of any symbol. Thus, the example function corresponds to the condition where the point ($x$) being interrogated for connectivity lies between two points B and G (to the left and right of $x$) and the function states that $x$ is necessary for connectivity if neither D′ nor E (the points below and above) is present. Obviously, if the point D has been retained by an earlier operation during the present iteration, the point $x$ is not necessary for connectivity. Similarly, if the point E is present, the point $x$ is not necessary for connectivity. Thus if either D′ or E are present, $x$ is not a connectivity point and the function $BG(D'+E)$ is zero. Most of the Boolean functions correspond to several possible ("or") conditions and the connectivity condition diagrams show each of these conditions. Boolean statements can generally be written in several forms for any given condition and those shown in FIGURE 4 are considered to be relatively economical to embody, and not necessarily the simplest for purposes of description. For example, the first Boolean function $AC\overline{B}'(\overline{D'GE})$ is a simple description of the three connectivity conditions that are shown and for simplicity of understanding could be rewritten as $AC\overline{B'D'}+AC\overline{B'G}+AC\overline{B'E}$, using well-known substitutions. Similarly, the example function could be rewritten as $BG\overline{D'E}$ to provide a more straight-forward correspondence to its associated connectivity diagram.

Figure 5A:
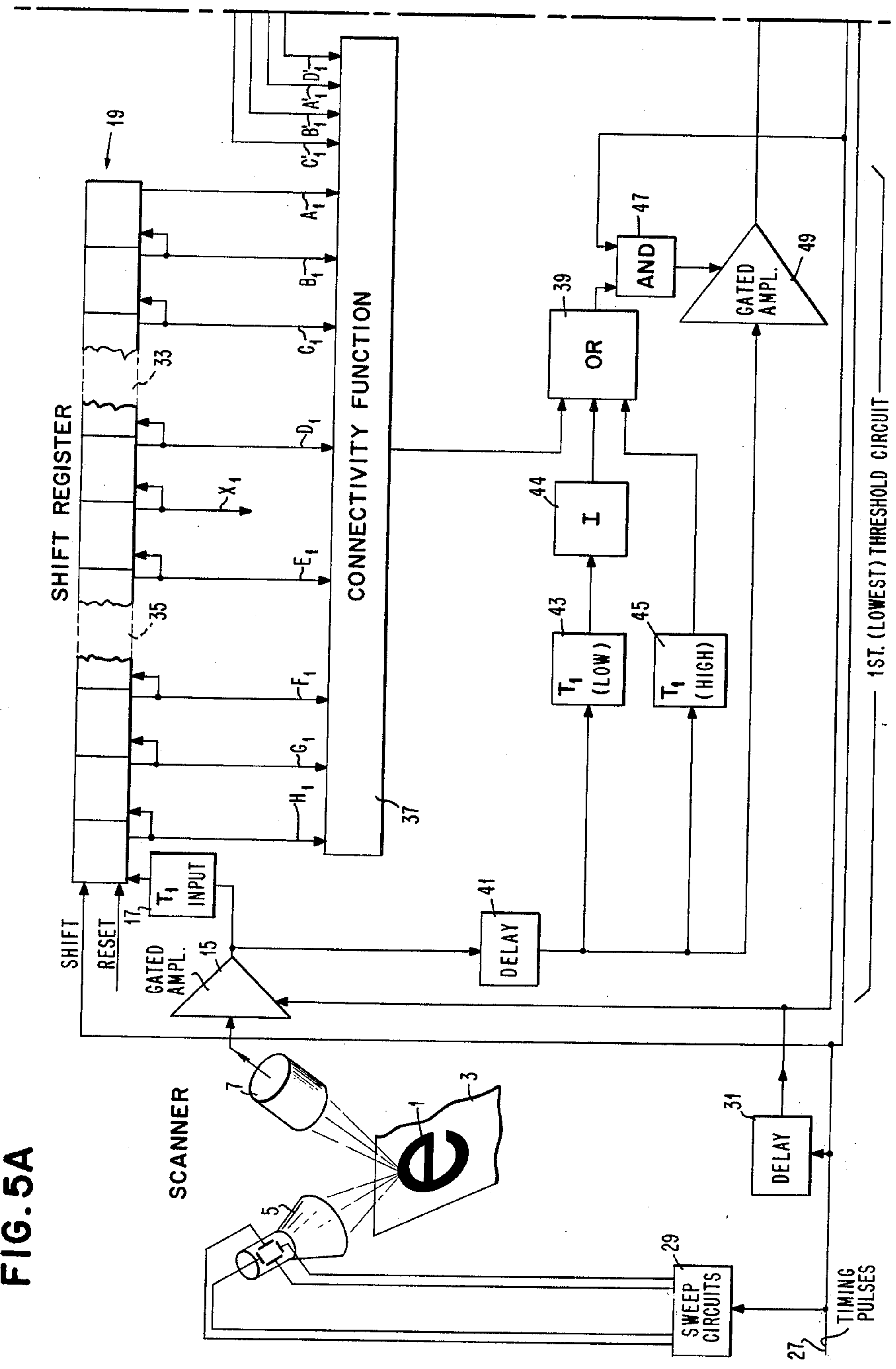
Figure 5B:
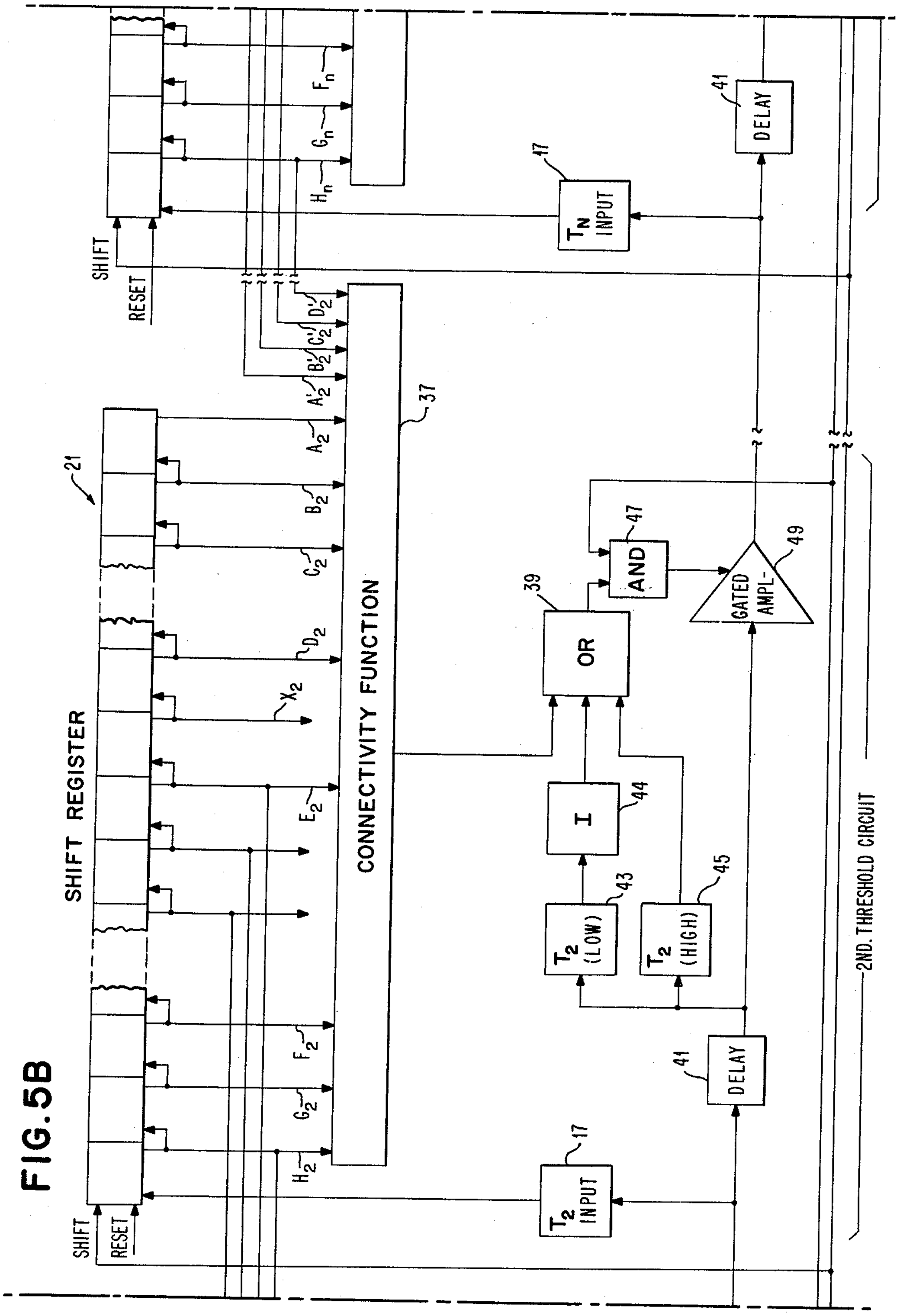
Figures 5, 5C:
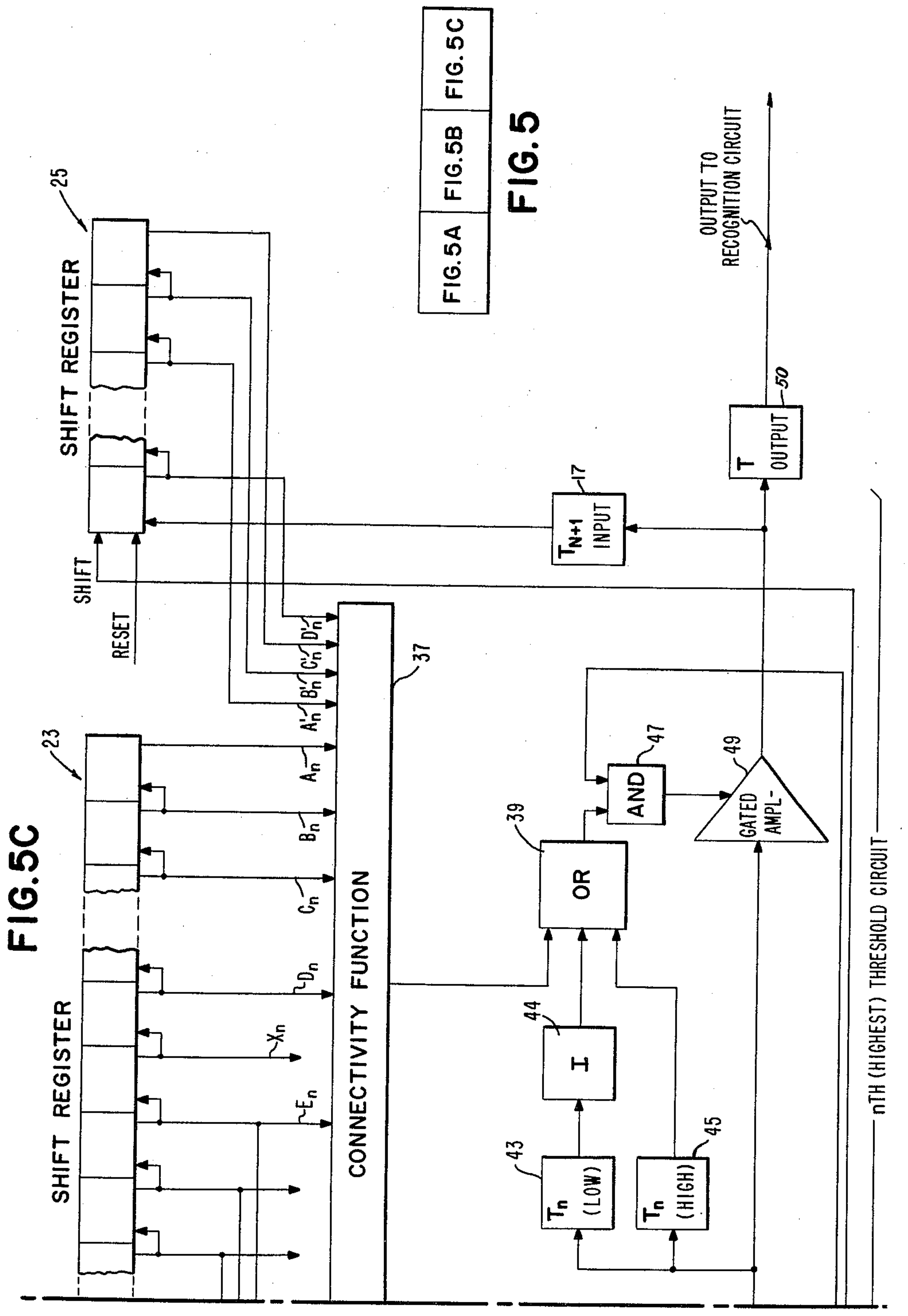

The preferred embodiment of the invention is shown in detail in FIGURES 5*a*, 5*b* and 5*c*. A specimen 1, (FIG. 5*a*) on a document 3 is scanned by a flying spot scanner 5 and the reflected light is sensed by a light-sensitive device 7. The specimen is scanned from bottom to top by a sequence of vertical lines, starting from the left. The signal from the light-sensitive device is applied through a gated amplifier 15 and a threshold circuit 17 to the input of a shift register 19. This shift register and shift registers 21, 23 and 25 are each reset prior to operation. Timing pulses on a lead 27 are used to synchronize the flying spot scanner sweep circuits 29; the shifting of the data in the shift registers 19, 21, 23 and 25; and, after a short delay (in a delay circuit 31), the operation of gated amplifier 15. In this manner, the scanner is sampled by the gated amplifier 15 and applied through the threshold circuit 17 to the shift register 19 at times that are interspersed between shift pulses to the shift register. The $T_1$-input threshold circuit 17 has a "1" output when the scanner output exceeds or is equal to a predetermined threshold and a "0" output for signals below this threshold. The threshold is not critical and is set to a relatively low value. For example, if the scanner output is considered to range between 0 (for a white document area) and 3 (intensely black area), and the specimen is operated on by the connectivity function in three sequential steps (as shown in FIGURE 3), then the $T_1$-input threshold circuit 17 is set to a value corresponding to approximately one-half unit of intensity or less. A threshold circuit suitable for use as the $T_1$-input threshold circuit and all other threshold circuits shown in FIGURE 5 will be described in detail later with respect to FIGURE 8. Since the design and adjustment of these circuits are not critical, many of the well-known threshold circuits could be employed.

Shift register 19 generates the operating zone data referred to in FIGURE 4 on leads labeled $A_1$, $B_1$, $C_1$, $D_1$, $E_1$, $F_1$, $G_1$ and $H_1$. The reference area "$x_1$" is also shown to be generated to indicate its position relative to areas $A_1$–$H_1$. Since this data ($x_1$) is not required for the operation of the circuit, the $x_1$ lead from the shift register is unused. This data is in binary form because of the operation of threshold circuit 17. Since the scanning raster is comprised of a sequence of vertical lines (from bottom to top) starting from the left portion of the specimen, the operating zone areas A, B and C are adjacently scanned. Area D is scanned at a time after the scanning of area A corresponding to the time taken to scan one vertical line. Areas $x$ and E are scanned immediately after area D is scanned and areas F, G and H are subsequently scanned. Therefore, data indicative of area A progresses the furthest through shift register 19, the area B indication immediately follows the area A indication and the area C indication immediately follows the area B indication. A "break" 33 is shown in shift register 19 indicating that several register elements are not shown. The number of shift register elements is a function of the number of sampling points during each vertical sweep. For example, if the vertical sweep is repeated once for every twenty timing pulses, nineteen shift register positions are needed between the positions that generate $x_1$ and $B_1$ (or any two horizontally-adjacent positions) and the break 33 indicates that seventeen register positions are not shown. These seventeen positions could obviously be replaced by a lumped delay for circuit economy. The last data that is applied to the shift register 19 corresponds to operating zone areas F, G and H and the corresponding shift register positions are shown to be separated from the remainder of the shift registers by a break 35, which represents seventeen positions that are not shown. A shift register circuit suitable for use for the shift registers shown in FIGURE 5 will be described in detail later with respect to FIGURE 9.

The shift register 19 output data coresponding to the operating zone areas A through H is applied to a connectivity function circuit 37 along with data from the subsequent shift register 21 representing $A'_1$, $B'_1$, $C'_1$ and $D'_1$ (which are indicative of the result of previous operations during the present iteration on those operating zone areas that are scanned prior to the scanning of $x_1$). The connectivity function circuit will be described in detail later with respect to FIGURE 6. The connectivity function circuit 37 output indicates whether $x_1$ is necessary for line continuity and is applied to an "or" gate 39. The two remaining inputs that are applied to this "or" gate are indicative of the intensity range of area $x_1$. A fixed delay 41, equal to the time required for scanned data to reach shift register position $x_1$, supplies an analog signal indicative of the intensity of area $x_1$, to a $T_1$-low threshold circuit 43 and a $T_1$-high threshold circuit 45. These circuits provide binary output signals that are indicative of the relative intensity of area $x$, with respect to predetermined threshold intensities. The $T_1$-low circuit 43 is adjusted to provide a binary "1" output signal where the intensity of area $x_1$ exceeds the lowest bound of the operating range of the first iteration, and the $T_1$-high circuit 45 provides a signal when the intensity of $x_1$ exceeds the upper bound of this range. With respect to the example shown in FIGURES 2*a* and 3 where the analog intensity is presumed to vary from zero units through three units, the $T_1$-low circuit is adjusted to a value of approximately one-half unit or less and the $T_1$-high circuit is adjusted to approximately one and one-half units. The $T_1$-low threshold circuit 43 output is inverted in circuit 44 (to provide a "1" signal when the intensity of $x_1$ is below its threshold) and applied to "or" gate 39. The output of the $T_1$-high circuit 45 is applied directly to the "or" gate. Thus, the "or" gate provides a "1" output signal when the area $x_1$ is necessary for connectivity or the intensity of area $x_1$ is outside of the range of the first iteration (below the threshold of the $T_1$-low circuit 43 or above the range of the $T_1$-high circuit 45). The "or" gate output controls an "and" gate 47 which, when conditioned, passes a timing pulse from delay 31 to control the sampling time of a non-inverting gated amplifier 49. The analog intensity signal from delay 41 is thus passed by amplifier 49 when area $x_1$ is to be retained by the first iteration. This signal is blocked by amplifier 49 when the intensity of area $x_1$ is within the operating range of the first iteration and is not necessary for connectivity. Thus the output of amplifier 49 represents the analog signal from gated amplifier 15 with certain portions of this analog signal reduced to zero. The portions that are deleted correspond to those input pattern areas which have intensities between the thresholds of the $T_1$ (low) and $T_1$ (high) threshold circuits 43, 45 and which are not necessary to preserve line continuity.

The circuit for the second and *n*th operations on the input specimen is shown in FIGURES 5*b* and 5*c* and is similar in function to the circuit described for the first stage of the iteration. The same reference numerals have been used for similar portions of the circuits. Some threshold circuits are adjusted to different values for the different stages of iterations and correspond to the predetermined ranges of operation of each iteration. For example, using the data shown in FIGURE 2*a*, the $T_2$-low threshold circuit 43 and the $T_2$-high circuit 45 are set to approximately 1½ and 2½ respectively, and the $T_n$-low threshold 43 circuit and the $T_n$-high threshold circuit 45 are set to approximately 2½ and 3½ respectively. With respect to the example of FIGURE 2*a*, the $T_2$ input, $T_n$ input and $T_{n+1}$ input threshold circuits 17 are adjusted to the same value as the $T_1$-input threshold circuit 17. All input threshold circuits could obviously be eliminated and their function incorporated into the scanner, but this change would decrease the system versatility. With respect to the example shown in FIGURE 2*a*, only three stages of iteration are necessary and the "*n*th" stage is fed by the 2nd stage, but is designated "*n*" to make the circuit in FIGURES 5*a*, 5*b* and 5*c* obviously extendable to any number of stages.

The output of the *n*th-stage gated amplifier 49 (FIG. 5*c*) is applied to a recognition circuit through a threshold circuit 50, which converts the analog signal into binary data corresponding to the output pattern, as shown in FIG. 2*b*.

Figure 7:
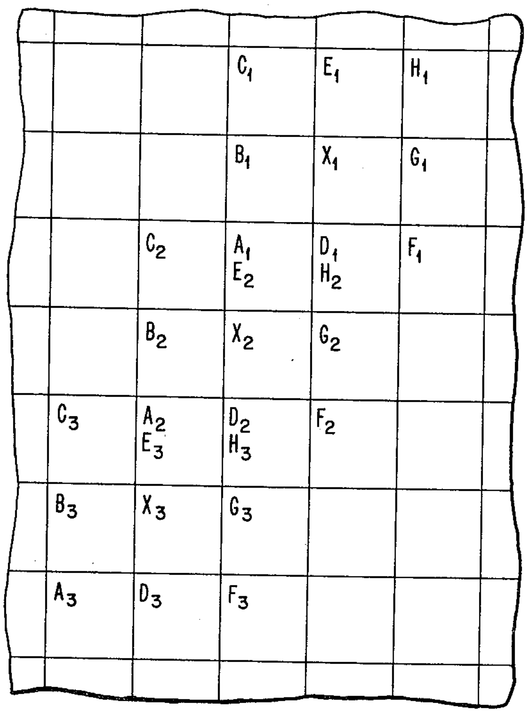
FIGURE 7 is a diagram illustrating the outputs of the shift registers shown in FIGURE 5.

The shift registers (21, 23) in all stages above the first stage differ from the first stage register 19 because they are required to generate the A, B, C and D signals for the adjacent lower order connectivity function 37. The relative positions of the signals in the shift registers are illustrated in FIGURE 7. The data in the second-order shift register 21 ($A_2$ through $H_2$) is determined by the previous outputs of the first-order threshold circuit and the data in the highest-order shift register 23 is determined by the previous outputs of the second-order threshold circuit. Since the output of gated amplifier 49 (representing the $x$ position of a stage of iteration) provides the first output of the shift register in the next stage of iteration after passing through one element of the shift register, this output corresponds to the point (D) on the input matrix (FIGURE 7) that is one sampling interval prior to (below) the $x$ data. This output is also labelled $H_2$ to show its relative position in the second stage of iteration. Thus, in FIGURE 7, $H_2(D_1)$ is located directly below $x_1$ and $H_3(D_2)$ is located directly below $x_2$. Using this analysis and FIGURE 7 it may be seen that $A_1$ corresponds to $E_2$, $D_1$ corresponds to $H_2$, and B and C correspond to the two outputs of shift register 21 that follow to the (left of) $E_2$. The leads to the connectivity function circuit 37 are labelled with primes ($A'_1$, $B'_1$, $C'_1$ and $D'_1$) because they represent the points A, B, C and D after the effect of the operation of the first stage of iteration. Similarly $A'_2$, $B'_2$, $C'_2$ and $D'_2$ are generated by shift register 23. An additional shift register 25 is used in the same manner to generate $A'_3$, $B'_3$, $C'_3$ and $D'_3$ as shown in FIGURE *5c*.

Figure 6A:
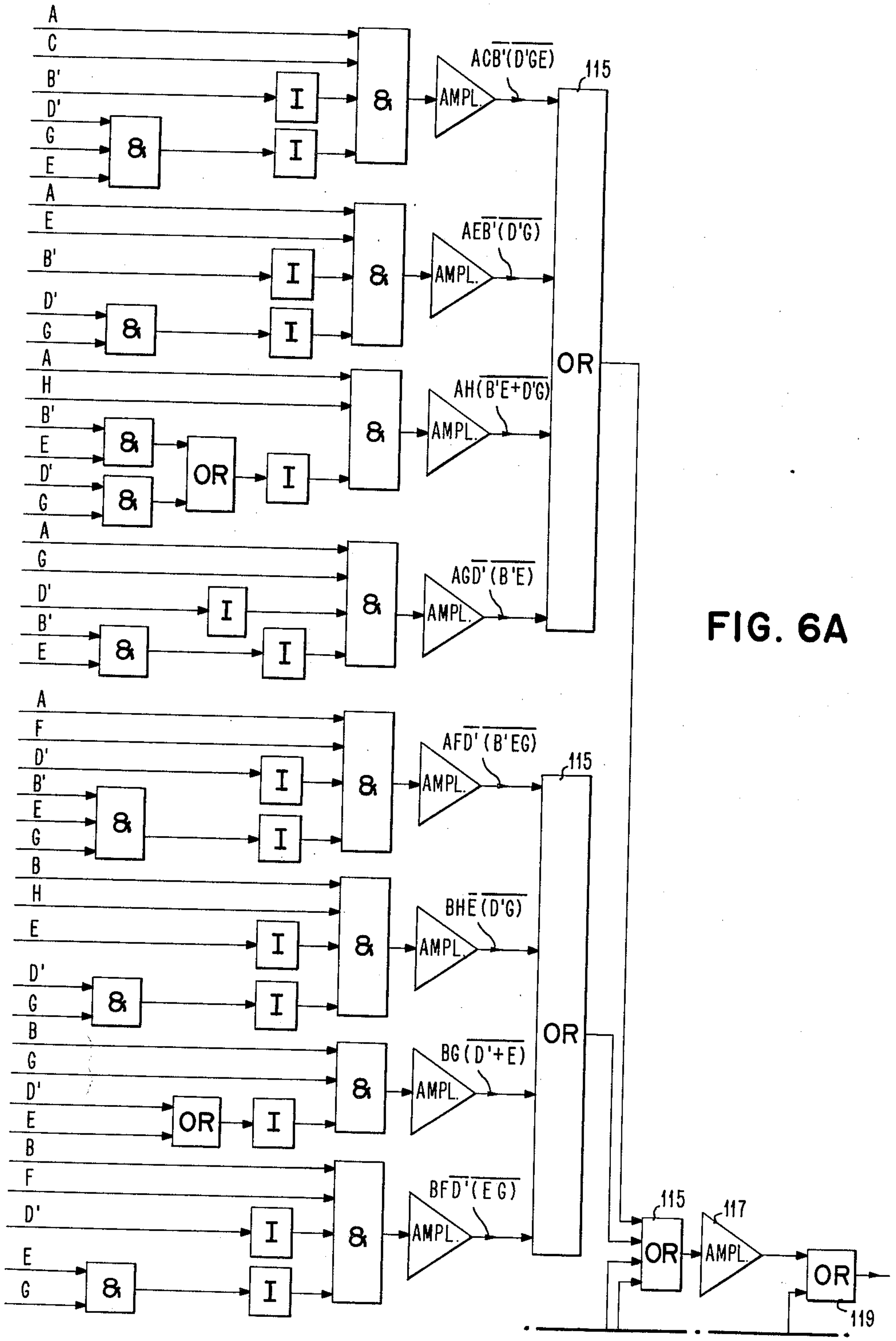
Figures 6, 6B:
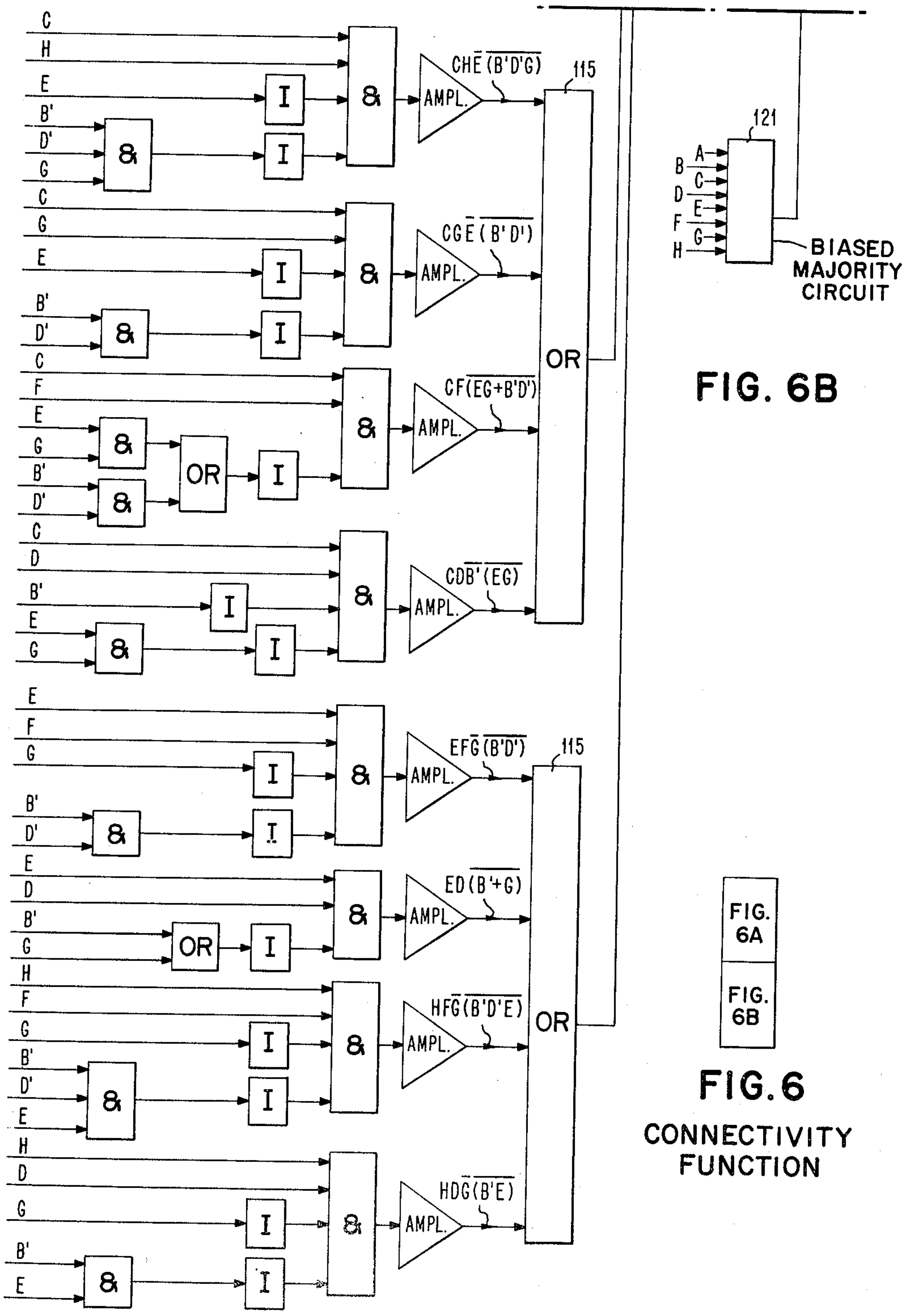

The connectivity function shown in block diagram form in FIGURES *6a* and *6b* is shown in greater detail in FIGURE 6. The Boolean functions in FIGURE 4 form the basis for the logic circuitry in FIGURE 6 which can be seen to comprise well-known "and" gates (indicated as &), "or" gates, inverters (indicated as I), and non-inverting amplifiers. These circuits generate the Boolean functions as indicated at the outputs of the amplifiers. Since each Boolean function represents one or more connectivity condition, these functions are combined in "or" gates 115 and are passed through an amplifier 117 to an "or" gate 119. The connectivity functions shown in FIGURE 4 are modified by the use of a biased majority circuit 121 which provides an output when the number of inputs that are present exceeds a predetermined threshold. This modification insures that points that are surrounded by a large number of points are retained even though they are not necessarily connecting points. This additional feature has been found to provide enhanced results and was used in generating the patterns shown in FIGURES *2b*, *3a*, *3b* and *3c* where any point surrounded by six or more points was retained. The output of the biased majority circuit 121 is also applied to "or" gate 119. The output signal from "or" gate 119 corresponds to the output of the connectivity function in FIGURE 5.

Figure 8:
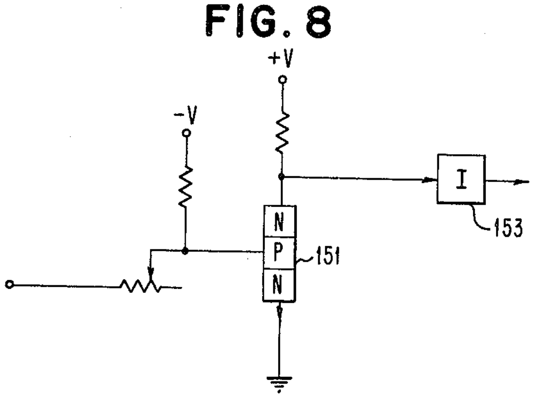
FIGURE 8 is a detailed diagram of the threshold circuit that is shown in block diagram form in FIGURE 5.

FIGURE 8 is a detailed diagram illustrating a threshold circuit that is suitable for use in the preferred embodiment of FIGURE 5. A transistor 151 is normally non-conducting due to a negative signal applied to its base region. In this case, the collector voltage is relatively high (positive). When the circuit input signal exceeds the threshold determined by the ohmic values of the input resistors, the transistor conducts and the collector voltage decreases. An inverter 153 reverses the collector voltage to provide a positive binary "1") signal when the input signal exceeds the predetermined threshold and a zero (binary "0") signal when the threshold is not exceeded.

Figure 9:
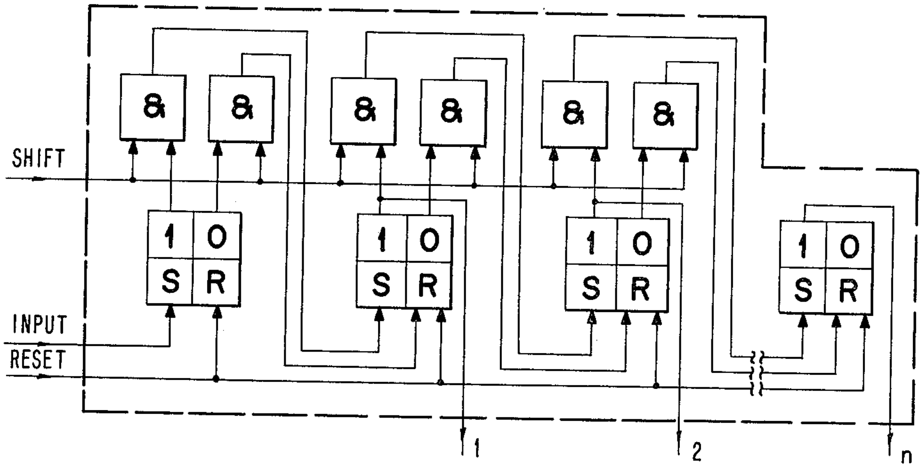
FIGURE 9 is a detailed diagram of the shift register that is shown in block diagram form in FIGURE 5.

FIGURE 9 illustrates a shift register that is suitable for use in the diagram of FIGURE 5. This register is comprised of a series of shift register "sections" in tandem. A text entitled Arithmetic Operations in Digital Computers, authored by R. K. Richards and published in 1955 by the Van Nostrand Company contains a description of these and other shift register sections at pages 144–148. A reset input is applied to each flip-flop in the register. The data input to the shift register is applied serially to the set input of the lowest-order flip-flop. Shift pulses are applied to the shift register in between each input data bit. These pulses condition the "and" gates which cause the data stored in each flip-flop to be transferred to the next highest order flip-flop. Outputs are provided to indicate the data in the various orders of the register.

Figure 10:
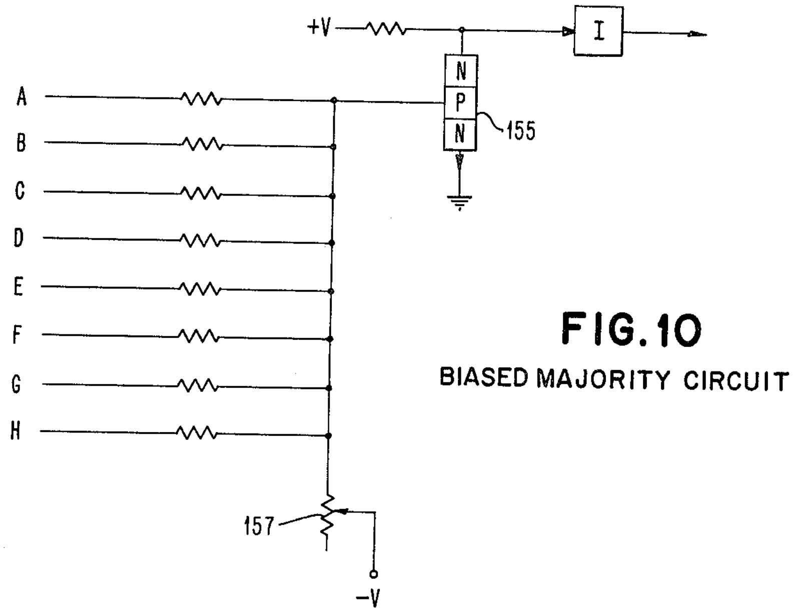
FIGURE 10 is a detailed diagram of the biased majority circuit that is shown in block diagram form in FIGURE 6.

A biased majority circuit is illustrated in FIGURE 10 and is suitable for use in the connectivity function circuit 121 shown in FIGURE 6. This circuit is similar in operation to the threshold circuit shown and described with respect to FIGURE 8, but has several binary inputs which are combined in a resistor network before application to the transistor 155. In this manner, a positive (binary "1") signal is generated when the sum of the binary inputs exceeds the threshold determined by the setting of a potentiometer 157.

The preferred embodiment of the invention that has been described and shown illustrates techniques for preprocessing a specimen pattern to provide an output pattern with enhanced characteristics. This resulting pattern is then applied to a recognition system which provides an indication of the identity of the specimen. The input specimen that was chosen for the purpose of describing the invention is a two-dimensional intensity distribution of a character as obtained from a conventional scanning apparatus, but could obviously be replaced by any array of multi-valued data. In accordance with the invention, a connectivity function is repeatedly applied to the specimen using different thresholds for each iteration. In this manner, a resulting continuous, thin-line pattern is generated which tends to follow the intensity ridge of the input specimen. The resulting thin-line pattern is superior to the input pattern for recognition purposes because it is relatively invariant to intensity and line width. That is, specimens of various line widths and intensities are effectively normalized to a thin-line binary output pattern which can then be identified by a relatively simple and economical recognition system.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for generating an output data representation of a relatively thin-line pattern from a multi-valued input data representation of a pattern of wider lines, comprising, in combination:

means, responsive to the input data representation, for generating an intermediate data representation of an intermediate pattern as a function of that input data having values that are less than a predetermined threshold and which represents connecting points in the intermediate pattern and as a function of that input data which has values that are greater than said predetermined threshold;

and means, responsive to the intermediate data representation, for generating the output data representation as a function of that input data which is determined to be necessary for connectivity by the intermediate data representation generator, and as a function of that input data having values that are greater than said predetermined threshold which represent connecting points in the pattern represented by the the output data.

2. An apparatus for operating on the data elements of a multi-valued representation of an input pattern of at least two dimensions for providing a representation of an output pattern which differs from the input pattern by the elimination of some non-zero data elements which are not required for pattern continuity comprising, in combination:

a connectivity function circuit responsive to that portion of the input data which has values which do not exceed a predetermined threshold for providing an indication of those data elements in this portion which are necessary for the retention of pattern continuity;

and means responsive to the indications provided by the connectivity function circuit and that input data which is not included in said portion, for providing the representation of the output pattern.

3. An apparatus for operating on the data elements of a multi-valued representation of an input pattern of at least two dimensions for providing a representation of an output pattern which differs from the input pattern by the elimination of some non-zero data elements which are not required for pattern continuity comprising, in combination:

a first connectivity function circuit responsive to a first portion of the input data which has values which do not exceed a predetermined threshold for providing an indication of those data elements in the first portion which are necessary for the retention of pattern continuity;

a second connectivity function circuit responsive to the indication provided by the first connectivity function circuit and to a second portion of the input data which has values which exceed said predetermined threshold, for providing an indication of the data elements in the second portion which are necessary for the retention of pattern continuity;

and means responsive to the indication provided by both connectivity function circuits for generating the representation of the output pattern.

4. An apparatus for operating on the data elements of a multi-valued representation of a two-dimensional input pattern for providing a representation of a two-dimensional output pattern which differs from the input pattern by the deletion of certain non-zero data elements which are not necessary for line continuity comprising, in combination:

threshold means for selecting those data elements that have values in each of a plurality of non-overlapping ranges of values;

a first operating zone function generator for selecting the data elements in the representation which corresponds to the area surrounding a given data element of the input pattern, for all data elements in the input pattern;

a first connectivity function generator responsive to the data selected by the first operating zone generator, for providing an indication of the data elements in the representation which are necessary for continuity;

a first gating means responsive to the threshold means and to the indication provided by the first connectivity function generator for providing an intermediate multi-valued representation containing those input data elements which have values that are outside of a first range of values and those data elements which have values within the first range of values that are necessary for line continuity;

a second operating zone function generator responsive to the intermediate representation for selecting the data elements in this representation which correspond to the area surrounding a given data element in the input pattern, for all data elements in the input pattern;

a second connectivity function generator responsive to the data selected by the second operating zone function generator for providing an indication of the data elements which are necessary for line continuity;

and a second gating means responsive to the threshold means and to the indication provided by the second connectivity function generator for providing a representation containing those data elements in the intermediate representation which have values that are outside of a range of values that are higher than the first range of values and those data elements which have values within the higher range of values that are necessary for connectivity;

whereby the representation generated by the second gating means corresponds to the input two-dimensional pattern as modified by the deletion of certain data elements which are not necessary for line continuity.

5. An apparatus for operating on the data elements of a multi-valued, time-varying representation of a two-dimensional input pattern for providing a time-varying representation of a two-dimensional output pattern which differs from the input pattern by the deletion of certain non-zero data elements which are not necessary for line continuity comprising, in combination:

threshold means for selecting those data elements that have values in each of a plurality of non-overlapping ranges of values;

a first time-delay circuit responsive to the time-varying input representation for selecting the data elements in the time-varying input representation which correspond to the area surrounding a given data element of the input pattern, for all data elements in the input pattern;

a first connectivity function generator responsive to the data selected by the first time-delay circuit for providing an indication of the data elements in the representation which are necessary for continuity;

a first gating means responsive to the threshold means and to the indication provided by the first connectivity function generator for providing an intermediate multi-valued, time-varying representation containing those input data elements which have values that are outside of a first range of values and those data elements which have values within the first range of values that are necessary for line continuity;

a second time-delay circuit responsive to the intermediate time-varying representation for selecting the data elements in this representation which correspond to the area surrounding a given data element in the input pattern, for all data elements in the input pattern;

a second connectivity function generator responsive to the data selected by the second time-delay circuit for providing an indication of the data elements which are necessary for line continuity;

and a second gating means responsive to the threshold means and to the indication provided by the second connectivity function generator for providing a representation containing those data elements in the intermediate representation which have values that are outside of a range of values that is higher than the first range of values and those data elements which have values within the higher range of values that are necessary for connectivity;

whereby the representation generated by the second gating means corresponds to the input two-dimensional pattern as modified by the deletion of certain data elements which are not necessary for line continuity.

6. The apparatus described in claim 5, further limited by the use of shift registers as the time-delay circuits.

7. An apparatus for operating on the data elements of a multi-valued time-varying representation of a two-dimensional input pattern for providing a time-varying representation of a two-dimensional output pattern which differs from the input pattern by the deletion of certain non-zero data elements which are not necessary for line continuity comprising, in combination:

threshold means for selecting those data elements that have values in each of a plurality of non-overlapping ranges of values;

a first time-delay circuit responsive to the time-varying input representation for selecting the data elements in the time-varying input representation which correspond to the area surrounding a given data element of the input pattern, for all data elements in the input pattern;

a first biased majority circuit responsive to the data selected by the first time-delay circuit for providing an indication when the number of indications from the first time-delay circuit exceeds a predetermined value;

a first connectivity function generator responsive to the data selected by the first time-delay circuit and responsive to the output indication of the first biased majority circuit, for providing an indication of the data elements in the representation which are necessary for continuity;

a first gating means responsive to the threshold means and to the indication provided by the first connectivity function generator for providing an intermediate multi-valued, time-varying representation containing those input data elements which have values that are outside of a first range of values and those data elements which have values within the first range of values that are necessary for line continuity;

a second time-delay circuit responsive to the intermediate time-varying representation for selecting the data elements in this representation which correspond to the area surrounding a given data element in the input pattern, for all data elements in the input pattern;

a second biased majority circuit responsive to the data selected by the second time-delay circuit for providing an indication when the number of indications from the second time-delay circuit exceeds a predetermined value;

a second connectivity function generator responsive to the data selected by the second time-delay circuit and responsive to the output indication of the second biased majority circuit, for providing an indication of the data elements which are necessary for line continuity;

and a second gating means responsive to the threshold means and to the indication provided by the second connectivity function generator for providing a representation containing those data elements in the intermediate representation which have values that are outside of a range of values that is higher than the first range of values and those data elements which have values within the higher range of values that are necessary for connectivity;

whereby the representation generated by the second gating means corresponds to the input two-dimensional pattern as modified by the deletion of certain data elements which are not necessary for line continuity.

8. The apparatus described in claim 7 further limited by the use of shift registers as the time-delay circuits.

9. An apparatus for converting a representation of an input array of data elements, where at least one data element has a first non-zero value and at least one data element has a second non-zero value, into a representation of an output array with less non-zero data elements that are unnecessary to preserve the continuity between the remaining non-zero data elements, comprising, in combination:

means, responsive to the representation of the input array, for generating a representation of an intermediate array by rejecting those data elements in the input representation which have values within a first range of values, where the first range of values includes the first non-zero value and excludes the second non-zero value, and which are unnecessary to preserve continuity between the non-rejected data elements in the input array;

and means, responsive to the representation of the intermediate array, for generating the representation of the output array by rejecting those data elements in the representation of the intermediate array which have values within a second range of values, where the second range of values includes the second non-zero value, and which are unnecessary to preserve continuity between the non-rejected data elements in the intermediate array.

References Cited by the Examiner

UNITED STATES PATENTS

| | | | |
|---|---|---|---|
| 3,074,050 | 1/63 | Shulz | 340—146.3 |
| 3,104,372 | 9/63 | Rabinow | 340—146.3 |

MALCOLM A. MORRISON, *Primary Examiner.*